(12) United States Patent
Nourdine

(10) Patent No.: US 12,098,917 B2
(45) Date of Patent: Sep. 24, 2024

(54) DEVICE FOR MEASURING THE GEOMETRY OF AN AXLE OF A MOTOR VEHICLE

(71) Applicant: AUE KASSEL GMBH, Kassel (DE)

(72) Inventor: Ahmed Nourdine, Kassel (DE)

(73) Assignee: AUE KASSEL GMBH, Kassel (DE)

( * ) Notice: Subject to any disclaimer, the term of this patent is extended or adjusted under 35 U.S.C. 154(b) by 279 days.

(21) Appl. No.: 17/460,712

(22) Filed: Aug. 30, 2021

(65) Prior Publication Data

US 2022/0065607 A1   Mar. 3, 2022

(30) Foreign Application Priority Data

Aug. 31, 2020   (DE) .................... 10 2020 210 985.0

(51) Int. Cl.
  *G01B 5/00*   (2006.01)
  *G01B 5/20*   (2006.01)
  *G01B 5/24*   (2006.01)

(52) U.S. Cl.
  CPC ............ *G01B 5/0025* (2013.01); *G01B 5/20* (2013.01); *G01B 5/24* (2013.01)

(58) Field of Classification Search
  CPC .......... G01B 5/0025; G01B 5/20; G01B 5/24; G01B 5/0009; G01B 5/255; G01B 21/20; G01B 5/0002; G01B 5/0004; G01B 11/24; G01B 11/26; G01B 21/22
  See application file for complete search history.

(56) References Cited

U.S. PATENT DOCUMENTS

| | | | |
|---|---|---|---|
| 5,027,275 A | 6/1991 | Sakamoto et al. | |
| 6,282,799 B1 * | 9/2001 | Warkotsch | G01B 5/255 33/203.18 |
| 6,404,486 B1 * | 6/2002 | Nobis | G01B 11/2755 356/139.09 |
| 7,117,603 B1 * | 10/2006 | Pellegrino | G01B 5/255 33/203.18 |
| 7,337,548 B2 * | 3/2008 | Hohlrieder | G01B 5/255 33/203.18 |
| 7,710,555 B2 * | 5/2010 | Hoenke | G01C 1/04 356/139.09 |

(Continued)

FOREIGN PATENT DOCUMENTS

| | | | |
|---|---|---|---|
| DE | 3136145 A1 | 3/1983 | |
| DE | 3887479 | * 3/1994 | ............ G01M 17/06 |

(Continued)

*Primary Examiner* — Yaritza Guadalupe-McCall
(74) *Attorney, Agent, or Firm* — Dickinson Wright PLLC

(57) ABSTRACT

A device (1) at least for measuring the geometry of an axle (2) of a motor vehicle, with at least two mounting devices (4) for fastening the opposing ends (5) of the axle (2), and at least one detection means (9) for detection of at least one geometric parameter of the axle (2), wherein the mounting devices (4) are displaceably mounted in at least two spatial directions (X, Y), wherein each mounting device (4) features at least one fastening region (12) for fastening of one end (5) of the axle (2). A device (1) at least for measuring the geometry of an axle (2) of a motor vehicle which features a low-level of complexity and is of compact design is obtained in that at least the fastening region (12) of the mounting device (4) is pivot-mounted at least partially by means of at least two mutually movable, arched bearing surfaces (13).

20 Claims, 8 Drawing Sheets

(56) References Cited

U.S. PATENT DOCUMENTS

| | | | | |
|---|---|---|---|---|
| 8,009,282 | B2 * | 8/2011 | Tohyama | G01B 11/272 |
| | | | | 356/138 |
| 10,234,259 | B2 * | 3/2019 | Nourdine | B60B 27/00 |
| 2007/0089306 | A1 * | 4/2007 | Hohlrieder | G01B 5/255 |
| | | | | 33/203.18 |
| 2008/0007016 | A1 * | 1/2008 | Hoenke | G01C 1/04 |
| | | | | 356/152.3 |
| 2017/0089687 | A1 * | 3/2017 | Nourdine | B60B 27/00 |
| 2022/0065607 | A1 * | 3/2022 | Nourdine | G01B 5/0009 |
| 2022/0136824 | A1 * | 5/2022 | Arruda | G01B 11/275 |
| | | | | 356/139.09 |

FOREIGN PATENT DOCUMENTS

| | | | | |
|---|---|---|---|---|
| DE | 38 87 479 T2 | 5/1994 | | |
| DE | 102005029575 A1 * | 12/2006 | | G01B 5/255 |
| DE | 10 2005 042 025 A1 | 3/2007 | | |
| DE | 10 2016 110 830 A1 | 12/2016 | | |
| EP | 3961146 A1 * | 3/2022 | | G01B 5/0009 |
| WO | WO-9220997 A1 * | 11/1992 | | G01B 5/255 |

* cited by examiner

DEVICE FOR MEASURING THE GEOMETRY OF AN AXLE OF A MOTOR VEHICLE

CROSS-REFERENCE TO RELATED APPLICATIONS

This application claims the benefit of priority under 35 U.S.C. § 119 to German Patent Application No. 10 2020 210 985.0, filed Aug. 31, 2020, the contents of which are incorporated herein by reference in their entirety.

FIELD OF THE INVENTION

The invention relates to a device at least for measuring, and in particular also for adjusting, the geometry of an axle of a motor vehicle. The device features at least two mounting devices for fastening the opposing ends of the axle. Furthermore, the device features at least one detection means for detection of at least one geometric parameter, for example, a track angle or camber angle of the axle. Each of the mounting devices is mounted so as to be movable in at least two spatial directions. Each mounting device features at least one fastening region for fastening of one end of the axle, in particular a wheel hub or a brake disk.

BACKGROUND

Devices of this kind are known in a plurality of embodiments from the prior art. Devices of this kind are used at least for measuring the geometry of an axle of a wheeled motor vehicle, in particular also for adjusting the geometry of an axle. To measure the geometry of an axle in the device, the axle is fastened primarily at the subframe bearings and at the wheel hub. The same conditions are established herein as prevail in the case of an actual vehicle. To simulate the load in the installed state, the axle is placed under load in the device with a force that corresponds to the weight of the vehicle.

During the measurement and/or adjustment process, the movement of the axle may not be restricted, in order to not affect the measured results. The freedom of movement of the wheel carriers in particular is of great importance. Consequently, the device must ensure a good flexibility in the fastening region.

If an adjustment is made, then the adjustment process generally proceeds by means of eccentric screws that adjust the angle of the wheel flange (and thus of the brake disk) relative to the lane (camber angle) and to the direction of travel (track angle). This adjustment simultaneously also produces a displacement of the wheel hub in space. Detection of the geometric parameters of the axle proceeds preferably at the brake disk.

The devices known from the prior art have the disadvantage that their construction is very complex and requires a lot of installation space. A particular size for the construction is required in the prior art in order to prevent a collision of the device with the brake caliper of the axle.

Thus the invention is based on the problem of specifying a device at least for measuring the geometry of an axle of a motor vehicle which has a reduced complexity and is of a more compact design.

SUMMARY AND INTRODUCTORY DESCRIPTION OF EMBODIMENTS OF THE INVENTION

The problem described above is solved in a device according to the described embodiments, in that the fastening region of the mounting device is pivot-mounted at least in part by means of at least two mutually movable, arched bearing surfaces.

This device is designed at least for measuring of at least one geometric parameter of an axle of a motor vehicle. Preferably the device is also designed for adjusting of at least one geometric parameter of the axle of a motor vehicle, for example, the track angle or camber angle. The device features at least one detection means for measuring the geometry of the axle. The detection means, for example, is designed for tactile and/or optical detection of at least one geometric parameter, in particular of the camber angle and/or of the track angle. Preferably at least one adjusting means, in particular a plurality of adjusting means, are provided in order to adjust the geometric parameters of the axle by means of the various adjusting screws on the axle.

An axle can be fastened in the device among others by fastening the axle on both sides in one mounting device each. Preferably the axle is fastened at the wheel hubs and/or at the brake disks.

The mounting devices are each secured in a movable manner in at least two spatial directions, in particular in at least one support frame of the device so that the mounting devices can be moved up onto the axle.

To fasten one end of an axle, in particular the wheel hub, each mounting device features at least one fastening region. The fastening region is designed, for example, such that it rests at least partly against one brake disk and/or against the wheel hub of the axle, and/or at least partly accommodates the brake disk and/or the wheel hub. For example, the invention provides that the fastening region is designed such that with the fastening region a brake disk and/or wheel hub can be actively grasped, in particular with hydraulic, pneumatic or electrically movable clamping arms.

To prevent the axle from being influenced by the device, in particular due to the fastening on the device, the invention provides that at least the fastening region of the mounting device is seated in a pivoting manner at least partly by means of two mutually displaceable, arched bearing surfaces. The bearing surfaces slide toward each other so that the fastening region of the mounting device can rest in a flexible manner under different track and camber angles of the axle.

Even after a change in the track and/or camber angle during the fastening, in particular due to adjusting of the geometric parameters of the axle by means of the device, the fastening region mimics the movement of the axle due to the displacement of the bearing surfaces toward each other.

For example, a first bearing surface of the bearing surfaces is fixed to the mounting device and a second bearing surface slides along the first bearing surface. Preferably the bearing surfaces are designed as corresponding to each other. In particular the invention provides that the bearing surfaces are of spherical design. A first bearing surface is arched convex, for example, whereas the second bearing surface is arched concave. The fastening region of the mounting device is seated by means of a ball joint.

For example, the first bearing surface and the second bearing surface are each formed as surfaces that are arched in at least two directions. Preferably, the first bearing surface and the second bearing surface form a slide bearing. The first bearing surface and/or the second bearing surface are preferably formed in a closed annular shape. For example, it is provided that the first bearing surface and/or the second bearing surface has at least one recess, in particular a plurality of recesses. A recess is, for example, a slot, a hole or any other shaped penetration or depression.

The first bearing surface and the second bearing surface are preferably in contact with each other over their entire surface. In particular, it is provided that the first bearing surface and the second bearing surface are in full-surface contact with each other at least to the extent of the size of the first bearing surface or to the extent of the size of the second bearing surface. At least one of the bearing surfaces is in full-surface contact. This is particularly important in the case of bearing surfaces of different sizes. Preferably, it is provided that the first bearing surface and the second bearing surface are in form-fitting contact with each other.

The invention also provides that more than two bearing surfaces are provided, wherein the bearing surfaces are arranged such that two encasing bearing surfaces each are formed which move relative to each other with a movement of the fastening region.

The advantage of the invention over the prior art is that a compensation of angular changes in the track and camber relative to each other takes place by means of a movement of the two bearing surfaces. Due to the provision of the bearing surfaces, the Cardan mounting can be omitted, and a compact and simplified construction is now possible which offers an advantageous flexibility.

In addition, the design according to the invention is significantly lighter than those designs known from the prior art, which has a positive effect on the power consumption of the device.

According to a first embodiment of the device, the invention provides that the fastening region features at least one articulated head, and that a first bearing surface of the two bearing surfaces is designed on the articulated head. The first bearing surface on the articulated head, for example, is designed as an external perimeter surface or as an internal perimeter surface. For example, the articulated head features a convex arched external perimeter surface as the first bearing surface. Alternatively, the invention provides that the articulated head has a pot-shaped design with a concave arched internal perimeter surface.

The articulated head is mounted preferably in that it transfers the required mounting forces from the axle, in particular from the wheel hub to the device.

According to an additional embodiment of the device it turns out to be particularly advantageous when a hub dome of the fastening region is pivot mounted at least indirectly to the first bearing surface. In particular, the hub dome is designed such that the hub dome in the installed position extends past at least a portion of the wheel hub of an axle.

The invention provides that the hub dome is held onto the first bearing surface in a directly pivoting manner. Alternatively, the invention also provides that the hub dome is held to the bearing surface in an indirectly pivoting manner, for example, by means of an additional component. Both alternative designs makes it possible in a favorable manner that the hub dome will always extend past the wheel hub, even given a change in the track or camber angle and will rest against the brake disk of the axle. The pivoting of the hub dome is effected due to the sliding of the two bearing surfaces over each other.

In particular in order to simplify the assembly of the device, according to an additional embodiment the invention provides that the articulated head is of a multi-part design. In particular, the invention provides that the articulated head is of at least a two-part design. The invention provides that the articulated head is of a pot-shaped design and features an internal articulated head casing on which the first bearing surface is formed. Due to the multi-part design of the articulated head, it can be easily arranged and assembled.

Alternatively, the articulated head is designed in that an articulated head casing is pushed onto a mounting shaft and fastened. The first bearing surface is formed on the articulated head casing.

A favorable factor for the stability in an installed state of the axle in regard to an additional embodiment is provided by the invention in that at least the first bearing surface is arranged such that the first bearing surface penetrates at least in the installed state at least partly into a wheel hub of an axle, or at least partly extends past a wheel hub of an axle. This ensures that a force transfer onto the first bearing surface occurs in an advantageous manner. An instability in which the two bearing surfaces adversely slide against each other is thus prevented. Tipping torques are minimized in that the bearing surface penetrates preferably into the wheel hub or extends past a wheel hub of an axle.

Depending on the design of the device, the first bearing surface as the internal perimeter surface extends past the wheel hub of an axle from the outside. As an alternative, the invention provides that the first bearing surface as the external perimeter surface extends at least partly into the wheel hub. Due to the penetration or overlapping, the bearing surface and the wheel hub intersect in at least one imaginary plane, so that a preferred force transfer is assured.

Advantageously the wheel hub, in particular a wheel hub collar of the wheel hub, is accommodated in the fastening region, such that bearing forces are transferred generally perpendicularly onto the first bearing surface, in particular to an apex point of the first bearing surface, preferably in order to prevent an unintentional pivoting of the bearing surfaces. Due to such a most possibly stable bearing of the wheel hub in the fastening region, contact forces for fastening of the axle can be reduced and thus the measurement accuracy can be advantageously improved.

The adaptability of the device to angular changes is additionally enhanced in that according to one embodiment of the invention, at least a part of the fastening region is mounted in a rotatable manner so that a free rotation is possible. For example, the two bearing surfaces are designed such that a rotation is possible even about the two bearing surfaces. Furthermore the invention provides that the articulated head is mounted in a rotatable manner, for example, so that a free rotation is possible.

Furthermore the invention provides that the mounting shaft is held in an actively rotatable manner. For example, the mounting shaft can be rotated by means of an electric motor, for example, in order to carry out a measurement of axial run-out. As an alternative, the invention provides in particular that the hub dome is held in a rotation-locked manner.

According to another embodiment of the invention, the fastening region features at least one mounting shaft. For example, the mounting shaft is installed into a mounting opening in the fastening region and secured in the mounting opening, for example, with a screw which is screwed into a threaded blind hole of the centering spindle provided in the mounting opening.

In addition it has proven to be advantageous in accordance with another embodiment of the invention, that the mounting shaft is seated in a bearing casing in the mounting opening. The bearing casing in this regard is installed in the mounting opening and its contact collar rests against an open-side contact edge of the mounting opening.

An additional embodiment of the device provides that at least one centering spindle is provided. The invention provides preferably that a hub dome surrounds the centering spindle in a ring-shape so that a wheel hub can be installed between the centering spindle and hub dome, in particular in an at least partly pivoting manner. Advantageously at least one mounting gap is formed between the centering spindle and hub dome.

For example, the mounting shaft and centering spindle are designed as a single part or as multiple parts. The centering spindle is designed either as rigid or pivoting, preferably pivoting together with the hub dome. In a rigid arrangement of the centering spindle head, the invention provides that the centering spindle is screwed to a mounting shaft by a central screw. Furthermore the invention provides that the centering spindle is screwed to the hub dome. The centering spindle is preferably designed such that in the installed state, it is overlapped at least in part by the wheel hub of the axle. In particular in order to prevent a collision with a screw head of a drive shaft of the axle located inside of a wheel hub, according to an additional embodiment of the device, the invention provides that the centering spindle or the mounting shaft features a front-side recess. Depending on the particular embodiment, the recess is arranged either in the centering spindle or in the mounting shaft. The recess is designed preferably such that a collision with a screw nut of an axle in the installed state arranged inside of the wheel hub is prevented and the fastening region can act advantageously on the axle.

In order to simplify the assembly of the device, according to an additional embodiment the invention provides that the centering spindle is of a multi-part design. For example, the centering spindle is of a two-part or three-part design, in particular for mounting the centering spindle to pivot around the articulated head.

To advantageously keep the wheel hub on the centering spindle in different angular positions, according to another embodiment the invention provides that the centering spindle features at least one perimeter ring at a distance to a front-side end region, and that the centering spindle is designed to be conically tapered proceeding from the perimeter ring in the direction of the end region. In this way the wheel hub can slide easily onto the centering spindle when setting up the fastening region on an axle and is thus guided into the hub dome. The wheel hub is introduced in particular into the mounting gap between the centering spindle and hub dome.

For guiding the wheel hub into different angular positions, according to an additional embodiment of the invention it has proven to be particularly advantageous that the centering spindle is designed to be at least partly conically tapered, proceeding from the perimeter ring in a direction away from the front-side end region. In this way the wheel hub can rest against the surface of the centering spindle head in different angular positions, without jamming between centering spindle and wheel hub.

According to a first alternative embodiment of the device, the invention provides that a second bearing surface of the two bearing surfaces is designed on a centering spindle, in particular as an internal perimeter surface. In this regard the mounting shaft features an articulated head, so that the centering spindle can pivot on the articulated head of the centering spindle. The preferably at least two-part design of the centering spindle is held so as to pivot on the articulated head of the centering spindle. In this exemplary embodiment the hub dome is rigidly attached to the centering spindle, for example, and pivots together with the centering spindle on the articulated head of the centering spindle, in order to follow a change in the geometric parameters of the axle during the adjustment process.

The articulated head of the centering spindle is designed, for example, so that an articulated head casing can be pushed from one end side onto the mounting shaft, and the articulated head casing rests against an end collar of the centering spindle. The articulated head casing in the assembled state is held advantageously between the end collar and the bearing casing surrounding the mounting shaft. The articulated head casing features a spherically arched first bearing surface on which a corresponding, spherically arched second bearing surface of the centering spindle head is displaceably held.

The hub dome is preferably connected to the centering spindle in that it is rigidly screwed to the centering spindle. The hub dome is preferably screwed to a reinforcing ring and the centering spindle is at least partly tensioned between the hub dome and reinforcing ring.

In the first alternative described above, the centering spindle is of a pivoting design and in case of a change in the angle, track or camber, the axle will pivot together with the hub dome, in that the first bearing surface and the second bearing surface slide onto each other.

In this embodiment the invention also provides that a prefabricated spherical plain bearing is arranged between the centering spindle and the mounting shaft. The spherical plain bearing includes the first bearing surface and the second bearing surface.

In this embodiment an external part of the spherical plain bearing which includes the second bearing surface is viewed as a part of the centering spindle and an internal part of the spherical plain bearing which includes the first bearing surface is viewed as the articulated head. For the assembly, the spherical plain bearing is brought onto the mounting shaft and inserted into the centering spindle, in particular into a centering spindle external element. Also when using a prefabricated spherical plain bearing according to the teaching of the present invention, the centering spindle is thus seated on the articulated head of the mounting shaft in a pivoting manner.

According to a second, alternative embodiment of the device, the invention provides that a second bearing surface of the two bearing surfaces is designed on one hub dome, in particular as an external perimeter surface, and that the hub dome is seated directly upon the articulated head, in particular of an internal perimeter surface of the articulated head. Preferably the articulated head has a pot-shaped design and at least partly surrounds the centering spindle.

In this exemplary embodiment the mounting shaft is designed as a single piece at least with a portion of the articulated head. The articulated head features preferably an internal articulated head casing which forms the first bearing surface. The first bearing surface is an internal perimeter surface.

The second bearing surface is formed on the hub dome so that the hub dome is designed so as to pivot against the first bearing surface. The centering spindle is arranged as being surrounded by the hub dome and is centrally screwed to the mounting shaft. In this embodiment in case of a change in angle, the wheel hub and possibly the brake disk pivot together with the hub dome, whereas the centering spindle remains fixed in place. In a change of angle the wheel hub moves along the centering spindle and is guided preferably from the perimeter ring on the centering spindle.

The internal articulated head casing surrounds the centering spindle so that the first bearing surface is arranged at a distance to the centering spindle and the hub dome with the second bearing surface can be introduced between the centering spindle and the first bearing surface. The wheel hub can be accommodated at least in part in a mounting gap between the pivoting hub dome and the rigidly arranged centering spindle.

It is also provided that a second bearing surface of the two bearing surfaces is formed on a hub dome, in particular as an outer circumferential surface. The hub dome is mounted on the articulated head, in particular on an inner circumferential surface of the articulated head, as the first bearing surface. Preferably, the articulated head is formed in a pot-like manner.

Preferably, for example, the mounting shaft is formed integrally with at least part of the articulated head. In particular, the articulated head has an internal articulated head casing which forms the first bearing surface. The first bearing surface is an inner circumferential surface. The hub dome is formed in several parts. The second bearing surface is formed on the hub dome, in particular on a hub dome casing of the hub dome, so that the hub dome is held pivotably on the first bearing surface.

In this embodiment, the wheel hub and possibly the brake disc pivot together with the hub dome in the event of an angular change, while the articulated head is stationary.

The internal articulated head casing is arranged in particular in a recess in the articulated head, and preferably rests against a side wall of the recess. The width of the recess corresponds substantially to the width of the articulated head casing. The wheel hub, in particular the wheel hub collar, is at least partially receivable in a recess in the hub dome. Preferably, at least one region with a reduced diameter is arranged in the recess so that the wheel hub can bear circumferentially against the region with the reduced diameter.

The diameter in the area of reduced diameter corresponds essentially, with the necessary clearance, to the outer diameter of the wheel hub collar.

The hub dome preferably has at least one hub dome disc, in particular for contacting the brake disc, and at least one shaft, preferably formed integrally with the hub dome disc. Preferably, the shaft extends substantially orthogonally to the hub dome disk. Preferably, the shaft has a substantially cylindrical outer surface. In particular, the shaft is completely or at least partially penetrated by the recess.

The hub dome casing is preferably arranged on the shaft of the hub dome. The inner diameter of the hub dome casing corresponds essentially to the outer diameter of the shaft, with the required fit. For example, the hub dome casing is secured to the shaft by a securing means, in particular by at least one securing means cooperating with at least one groove in the shaft of the hub dome. For example, the securing means is designed as a securing ring. The fastening region is designed either with a centering spindle or without a centering spindle.

It is particularly preferred that the internal articulated head casing and the hub dome casing are designed as a prefabricated pivoting bearing or spherical plain bearing, in particular a radial spherical plain bearing. The prefabricated spherical plain bearing, in particular radial spherical plain bearing, includes the first bearing surface and the second bearing surface. Nevertheless, a radially outer part of the spherical plain bearing including the first bearing surface is considered to be part of the articulated head, namely an internal articulated head casing, and an inner part of the spherical plain bearing including the second bearing surface is considered to be part of the hub dome, namely the hub dome casing. The spherical plain bearing is applied to the shaft of the hub dome for assembly and fixed with the securing means. Subsequently, the hub dome with the spherical plain bearing, in particular also with the internal articulated head casing, is inserted into the articulated head and fastened, for example, with the internal articulated head casing in a recess in the articulated head. For example, it is provided that a pivoting bearing or a spherical plain bearing, in particular a radial spherical plain bearing, is arranged between the hub dome and the articulated head, the spherical plain bearing comprising the first bearing surface and the second bearing surface.

The hub dome casing and/or the internal articulated head casing are preferably annular. For example, the first bearing surface is formed as a concave inner circumferential surface on the internal articulated head casing and the second bearing surface is formed as a convex outer circumferential surface on the hub dome casing. Preferably, the internal articulated head casing and/or the hub dome casing are formed mirror-symmetrically to an imaginary plane E, which is traversed by the axis A of the fastening region as a plane normal.

In particular, in order to detect the degree of contact of a brake disk with a contact surface of the hub dome, it is provided according to a further embodiment that the fastening region has at least one abutment ring. Preferably, the abutment ring completely surrounds the hub dome. Preferably, the abutment ring is spring-mounted so that it surrounds the abutment surface of the hub dome. Preferably, the abutment ring is mounted on the hub dome and/or on a mating ring. In particular, the abutment ring protrudes beyond the abutment surface of the hub dome so that it can be moved parallel to the axis A against a resilient bearing until it is aligned flush with the abutment surface. When a brake disc is correctly positioned, the abutment ring is fully aligned flush with the abutment surface.

The extent of the movement of the abutment ring can be detected by at least two, in particular at least four, at least six or at least eight sensors, whereby a correct contact of a brake disc with the abutment surface can be detected by means of the sensors. The sensors detect, for example, a distance covered by the abutment ring and/or the uniformity of a movement of the abutment ring over its circumference. If the abutment ring is moved by a brake disc unevenly or only over part of its circumference along the axis A, this indicates that the brake disc is not in correct contact. Preferably, the sensors are arranged on a mating ring rigidly connected to the hub dome. For example, the mating ring forms the thrust bearing for the spring-loaded bearing of the abutment ring.

The invention furthermore relates to a mounting device, in particular for fastening at least one of the opposing ends of an axle, preferably according to one of the above exemplary embodiments, particularly preferably for a device of the kind described above.

Additional favorable embodiments of the invention are presented in the following description of figures and in the dependent claims.

With regard to the following description it is claimed that the invention is not limited to the design examples and not to all or a plurality of features or described feature combinations, rather each individual partial feature of the design example is also of importance to the subject matter of the invention, even detached from all other partial features described in connection therewith, and also in combination with any other particular features of another design example.

Figure 1:
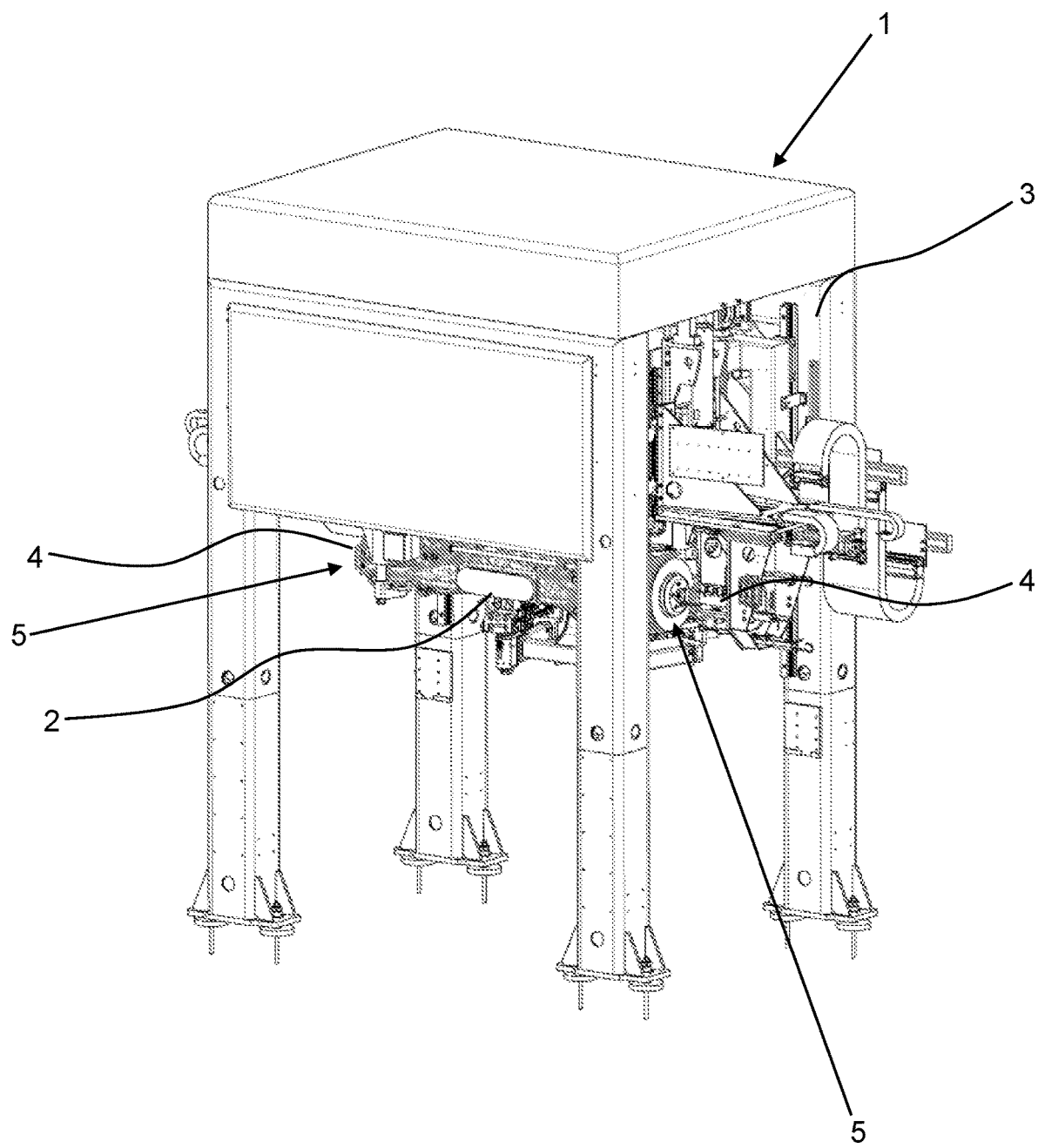
FIG. 1 An embodiment of a device for measuring and adjusting the geometry of an axle, perspective view, FIG. 2 A detailed view of an embodiment of a device according to FIG. 1, FIG. 3 Depicts an exemplary embodiment of a mounting device for a device according to FIG. 1, perspective view, FIG. 4 A cross-section through the mounting device according to FIG. 3, FIG. 5 Depicts an exemplary embodiment of a device according to FIG. 1, perspective view, FIG. 6 A cross-section through the mounting device according to FIG. 5.

FIG. 1 depicts a device 1 which is designed to measure and adjust geometric parameters, in particular the track angle and camber angle, of an axle 2 of a motor vehicle. The device 1 comprises a support frame 3 to which at least two mounting devices 4 arranged opposite each other are affixed for fastening of the opposing ends 5 of the axle 2. An axle 2 is disposed in the device 1, but the mounting devices are not yet in the mounted state in which the opposing ends 5 of the axle 2 are fastened.

Figure 2:
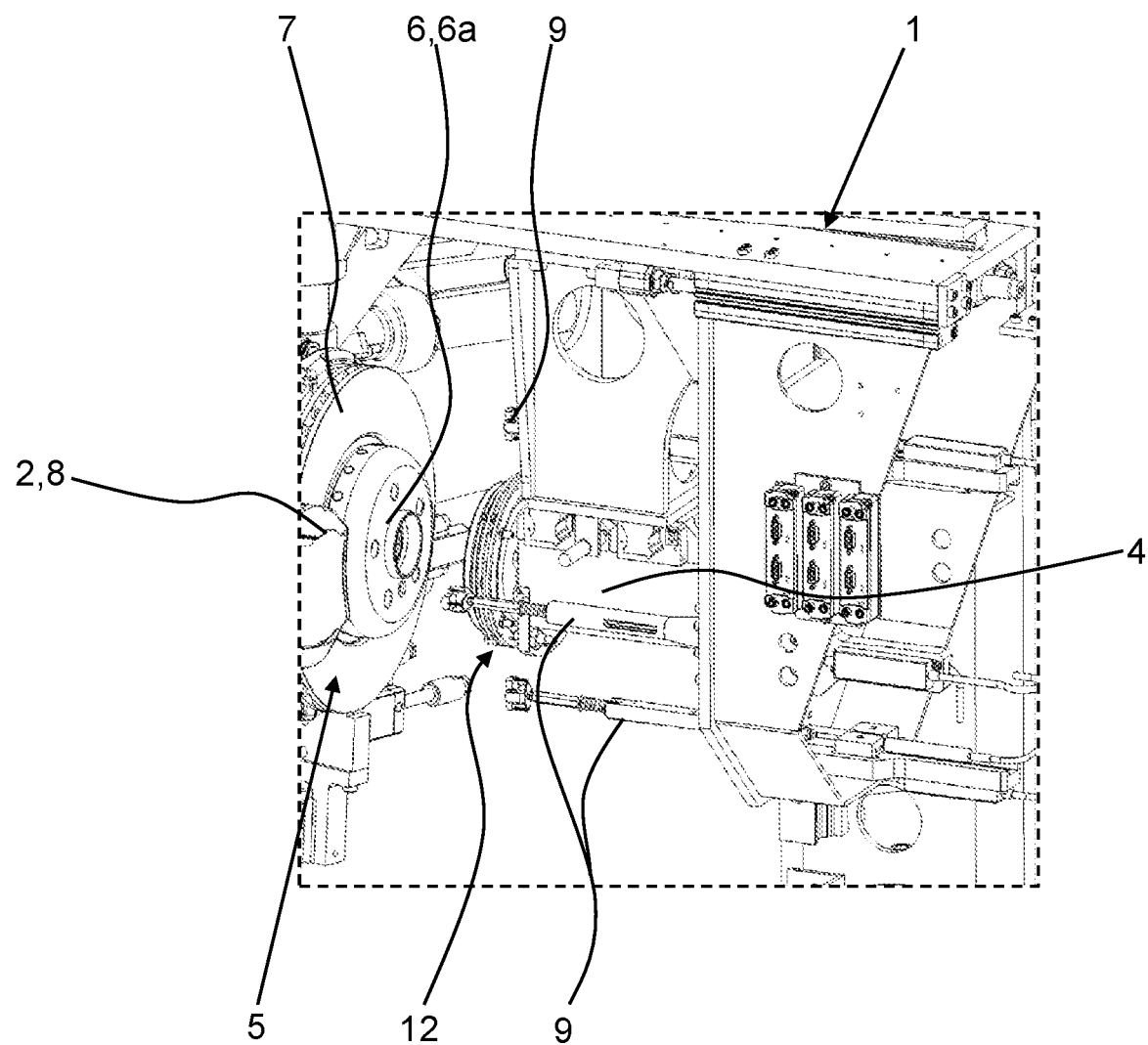

FIG. 2 provides an enlarged view of an embodiment of a device 1 according to FIG. 1. At its opposing ends 5 the axle 2 features, inter alia, a brake disk 7 attached to a wheel hub 6 and at least one brake caliper 8. One wheel hub collar 6a of the wheel hub 6 extends partly out from the brake disk 7.

According to FIG. 1 and FIG. 2, the device 1 features a plurality of detection means 9, which in this embodiment are designed as tactile sensors for tactile detection of the geometric parameters, in particular of the track and camber angles, of the axle 2. The mounting devices 4 which are illustrated separately in FIG. 3 to FIG. 8, are movably affixed to the device 1 in at least two spatial directions, in the present case, by a first bar arrangement 10 in the direction of a Y-axis, and by a second bar arrangement 11 in the direction of an X-axis. The mounting devices 4 can be brought up to the axle 2 by using the bar arrangements 10, 11. The two mounting devices 4 are of an identical design.

Each of the mounting devices 4 features a fastening region 12 for affixing of one end 5 of the axle 2. The fastening region 12 in the fastened state acts advantageously together with the wheel hub 6 and/or with the brake disk 7. The fastening region 12 can pivot spherically at least partly relative to an axis A which is parallel to the Y-axis.

Figure 3:
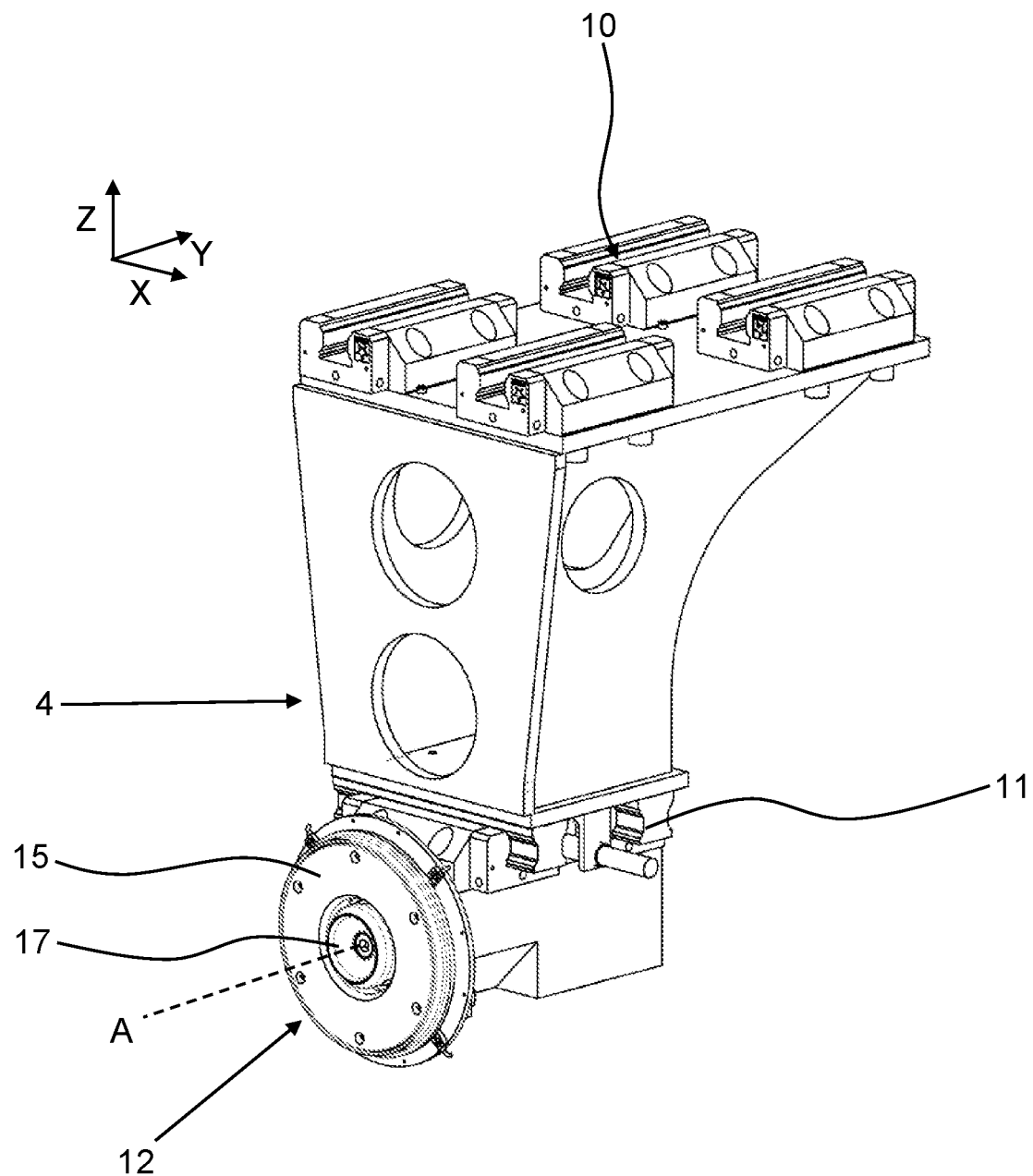
Figure 4:
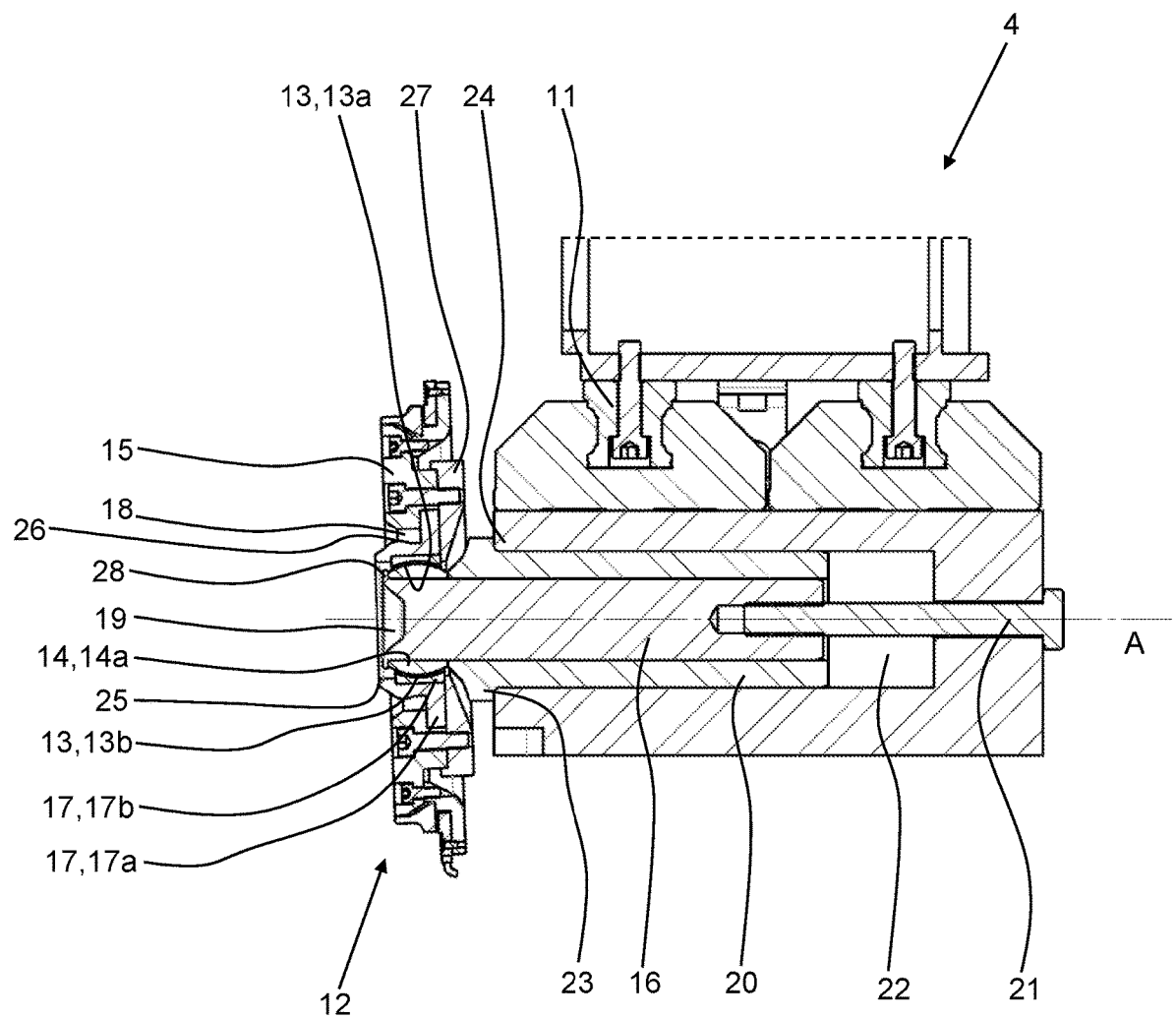

FIGS. 3 and 4 depict a first exemplary embodiment of a mounting device 4 for a device 1 according to FIGS. 1 and 2. The fastening region 12 of the mounting device 4 is pivot-mounted at least in part by means of at least two mutually movable, arched bearing surfaces 13. The bearing surfaces 13 are spherical (semi-spherical) and designed as corresponding to each other. The fastening region 12 features an articulated head 14. The first bearing surface 13a of the two bearing surfaces 13 is designed on the articulated head 14, namely here as an external perimeter surface. The articulated head 14 is surrounded by a hub dome 15. The hub dome 15 is pivot-mounted indirectly onto the first bearing surface 13a.

In addition, the fastening region 12 features a mounting shaft 16 and a centering spindle 17. The mounting shaft 16 extends along the axis A. The hub dome 15 surrounds the centering spindle 17 in a ring-shape, so that a wheel hub 6, in particular its wheel hub collar 6a, can be accommodated at least partly in a pivoting manner in a mounting gap 18 between the hub dome 15 and centering spindle 17. When the wheel hub collar 6a in the installed state has penetrated into the mounting gap 18, the first bearing surface 13a has penetrated at least partly into the wheel hub 6. In this embodiment the mounting shaft 16 features a front-side recess 19 which prevents a collision with a screw head of a drive shaft against the axle 2.

The mounting shaft 16 is seated in a bearing case 20. The mounting shaft 16 is secured in the recess opening 22 by a screw 21. A contact collar 23 of the bearing case 20 rests against a stop edge 24.

The centering spindle 17 is designed such that it features at least one perimeter ring 26 at a distance to a front-side end region 25. The perimeter ring 26 supports the insertion of the wheel hub 6 into the mounting gap 18.

Proceeding from the perimeter ring 26, the centering spindle 17 is designed as conically tapered both in the direction away from the front-side end region 25, and also in the direction toward the front-side end region 25. Thus the perimeter ring 26 protrudes convexly all around. Thus the wheel hub collar 6a is guided into the mounting gap 18 in an advantageous manner.

In this embodiment, the hub dome 15 is securely connected to the centering spindle 17 by means of the attachment ring 27. The attachment ring 27 is screwed to the hub dome 15, wherein the centering spindle 17 is clamped between the hub dome 15 and attachment ring 27. Thus the centering spindle 17 always pivots together with the hub dome 15.

To simplify the assembly, the centering spindle 17 is of a multi-part design and features a centering spindle external element 17a and a centering spindle internal element 17b. A second bearing surface 13b of the two bearing surfaces 13 is designed as an internal perimeter surface on the centering spindle 17, in particular on the centering spindle internal element 17b. The mounting shaft 16 features the articulated head 14, so that the centering spindle 17 with the second bearing surface 13b is pivot-mounted on the first bearing surface 13a at the articulated head 14 of the centering spindle 16. The first bearing surface 13a and the second bearing surface 13b slide onto each other during a movement.

The articulated head 14 is formed by an articulated head casing 14a which is pushed tightly onto the mounting shaft 16 and rests against one end collar 28 of the centering spindle 16. In the illustrated assembly state, the articulated head casing 14a is tensioned between the end collar 28 and bearing case 20.

The invention also provides that the centering spindle internal element 17b and the articulated head 14, in particular the articulated head casing 14a are part of a prefabricated spherical plain bearing which is seated upon the mounting shaft 16 and is installed into the centering spindle external element 17a. The spherical plain bearing includes the first bearing surface 13a and the second bearing surface 13b.

Figure 5:
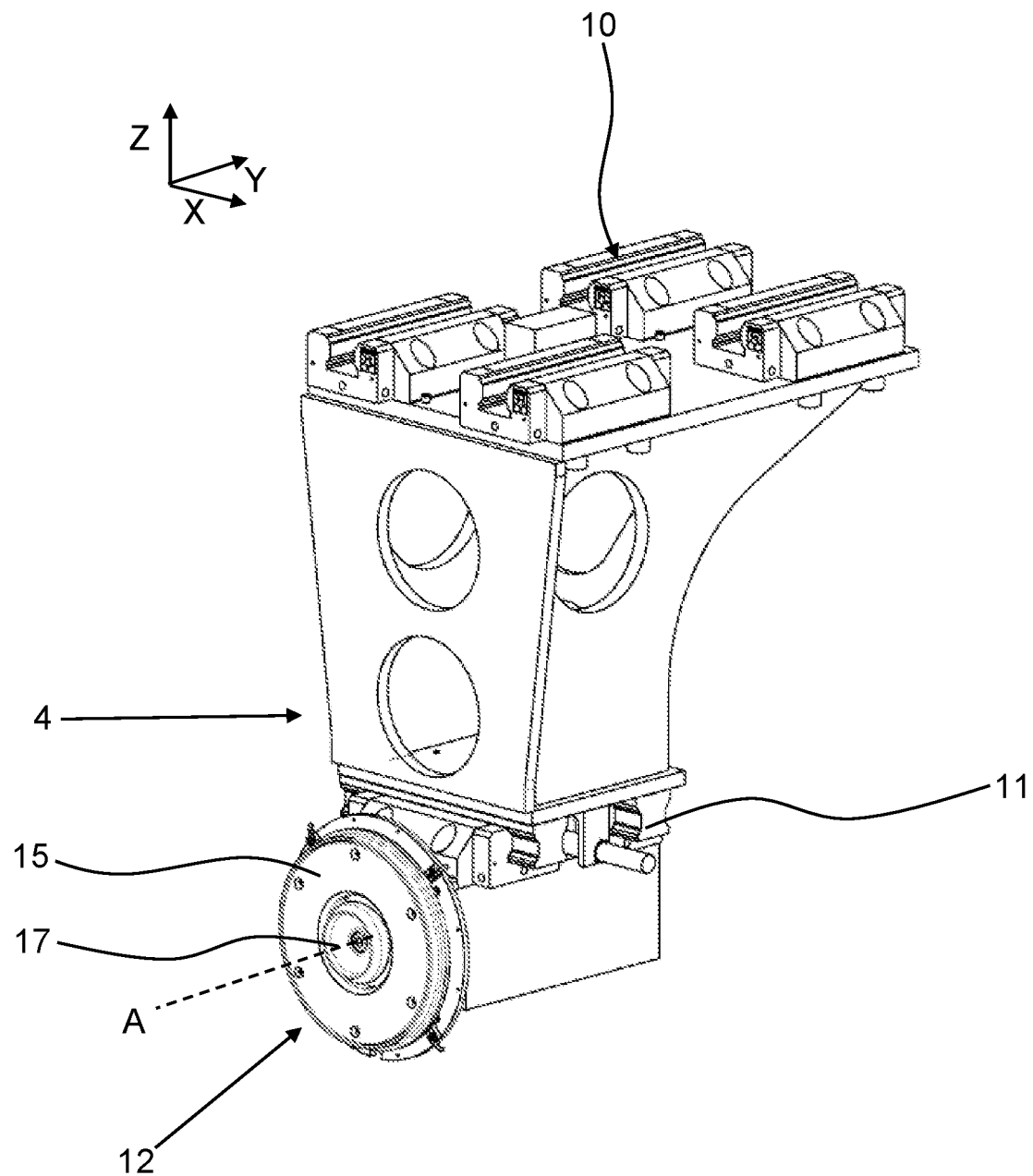
Figure 6:
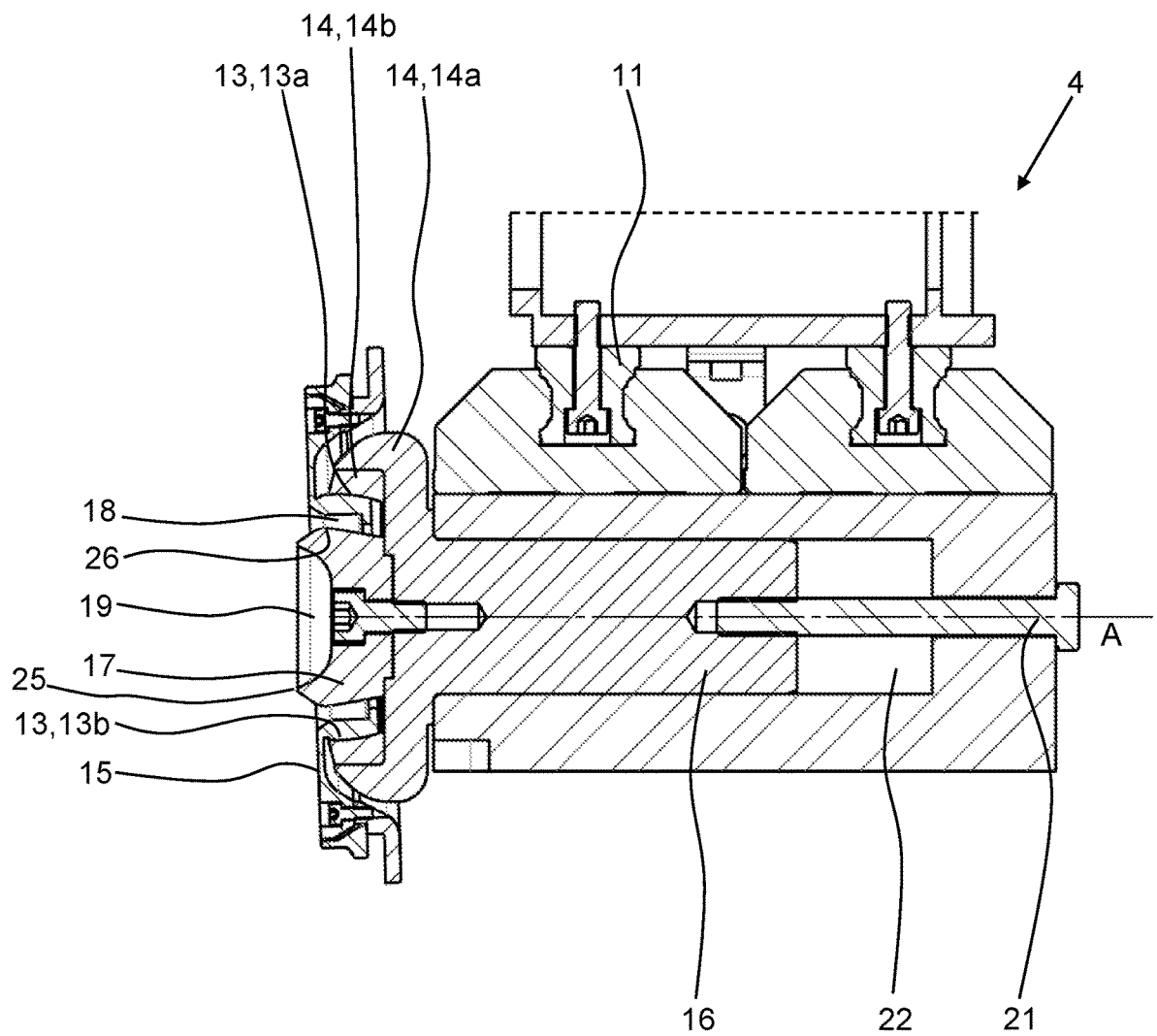

FIGS. 5 and 6 depict an alternative exemplary embodiment of a mounting device 4 for a device 1 according to the invention as indicated in FIG. 1. This example also features an articulated head 14 on which a first bearing surface 13a of the two bearing surfaces 13 is formed. The articulated head 14 has a pot-shape and the first bearing surface 13a is designed here as an internal perimeter surface.

A hub dome 15 of the fastening region 12 in this exemplary embodiment is pivot-mounted indirectly onto the first bearing surface 13a. A second bearing surface 13b of the two bearing surfaces 13 is designed as an external perimeter surface directly on the hub dome 15. Consequently, the hub dome 15 is seated directly on the articulated head 14 at the first bearing surface 13a. The articulated head 14 at least partly surrounds the centering spindle 17.

The fastening region 12 features a mounting shaft 16 and a centering spindle 17. The mounting shaft 16 is designed as a single part together with a portion of the articulated head 14, and extends along the axis A. The articulated head 14 features an articulated head external element 14a and an internal articulated head casing 14b. The first bearing surface 13a is designed here at the internal articulated head casing 14b of the articulated head 14.

The internal articulated head casing 14b is of a two-part design with respect to its perimeter, for example, it has two halves, to allow assembly onto the second bearing surface 13b. The two parts of the internal articulated head casing 14b are screwed separately to the articulated head external element 14a. The internal articulated head casing 14b simplifies the assembly of the articulated head 14, in particular the arrangement of the second bearing surface 13b onto the first bearing surface 13a, due to its two-part configuration.

The hub dome 15 surrounds the centering spindle 17, so that a wheel hub 6, in particular its wheel hub collar 6a, can be accommodated at least partly in a pivoting manner in a mounting gap 18 between the hub dome 15 and centering spindle 17. In this embodiment the centering spindle 17 is not designed to pivot, but rather is rigidly screwed to the mounting shaft 16. Only the hub dome 15 is pivot-mounted to pivot around the centering spindle 17. The hub dome with the second bearing surface 13b is designed to pivot against the first bearing surface 13a relative to the centering spindle 17. The centering spindle 17 features a front-side recess 19 which accommodates a screw of a drive shaft in the wheel hub 6 in the installed state. The centering spindle 17 in this exemplary embodiment is of a one-part design. The mounting shaft 16 is secured in the assembly opening 22 by a screw 21.

In this embodiment as well, the centering spindle 17 features a perimeter ring 26, wherein the centering spindle 17, proceeding from the perimeter ring 26, is conically tapered both in the direction toward the front-side end region 25 and also in the direction away from the front-side end region 25. Thus the perimeter ring 26 protrudes outward. In the installed state a wheel hub 6 is accommodated in the mounting gap 18 between the hub dome 15 and centering spindle 17. If the track or camber angle of the axle 2 changes, that is, if the wheel hub 6 changes, then the first bearing surface 13a and the second bearing surface 13b pivot upon each other in order to adjust the hub dome 15 for fixation.

Figure 7:
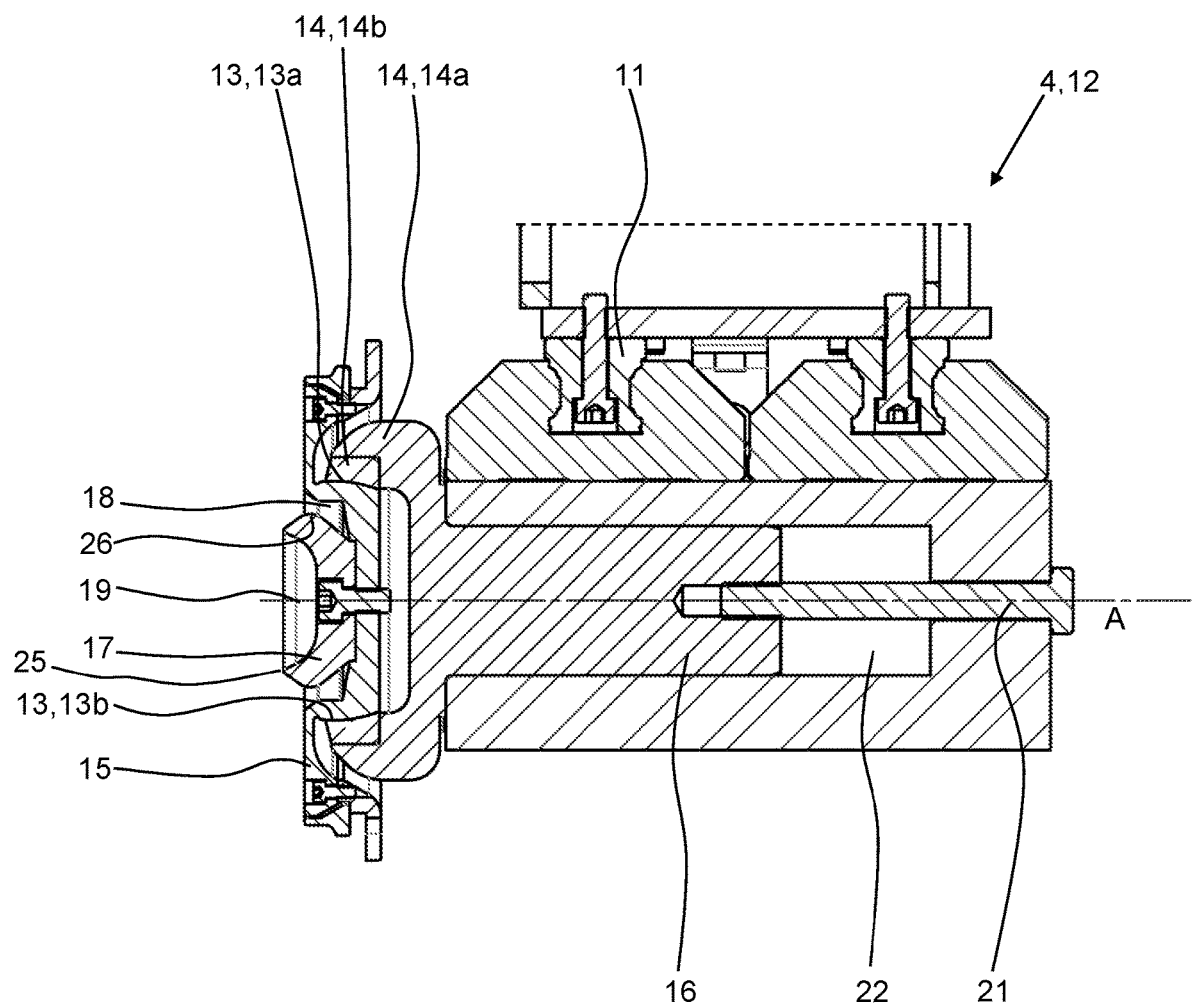
FIG. 7 Depicts a cross section through an additional exemplary embodiment of a mounting device for a device according to FIG. 1.

FIG. 7 depicts a cross section through an additional, alternative embodiment of a mounting device 4 for a device 1 according to FIG. 1. This example also features an articulated head 14 on which a first bearing surface 13a of the two bearing surfaces 13 is formed. The articulated head 14 has a pot-shape and the first bearing surface 13a is designed here as an internal perimeter surface.

A hub dome 15 of the fastening region 12 in this exemplary embodiment is pivot-mounted directly onto the first bearing surface 13a. A second bearing surface 13b of the two bearing surfaces 13 is designed as an external perimeter surface directly on the hub dome 15. Consequently, the hub dome 15 is seated directly on the articulated head 14 at the first bearing surface 13a.

The fastening region 12 features a mounting shaft 16 and a centering spindle 17. The mounting shaft 16 is designed as a single part together with a portion of the articulated head 14, and extends along the axis A. The articulated head 14 features an articulated head external element 14a and an internal articulated head casing 14b. The articulated head external element 14a is designed as a single part with the mounting shaft 16. The first bearing surface 13a is designed here at the internal articulated head casing 14b of the articulated head 14.

The internal articulated head casing 14b is of a two-part design with respect to its perimeter, for example, it has two halves, to allow assembly onto the second bearing surface 13b. The two parts of the internal articulated head casing 14b are screwed separately to the articulated head external element 14a. The internal articulated head casing 14b simplifies the assembly of the articulated head 14, in particular the arrangement of the second bearing surface 13b onto the first bearing surface 13a, due to its two-part configuration.

The hub dome 15 surrounds the centering spindle 17, so that a wheel hub 6, in particular its wheel hub collar 6a, can be accommodated in a mounting gap 18 between the hub dome 15 and centering spindle 17. In this embodiment the hub dome 15 has an enclosed design in the direction of the mounting shaft 16. The centering spindle 17 is screwed to the hub dome 15 so that it pivots together with the hub dome 15. The hub dome 15 with the second bearing surface 13b is designed to pivot on the first bearing surface 13a. The centering spindle 17 is used solely to introduce the wheel hub 6 into the mounting gap 18. Consequently, an embodiment without the centering spindle 17 is provided.

The centering spindle 17 features a front-side recess 19 which prevents a collision with a screw of a drive shaft in the wheel hub 6 in the installed state. The centering spindle 17 in this exemplary embodiment is of a one-part design. The mounting shaft 16 is secured in the assembly opening 22 by a screw 21.

In this embodiment as well, the centering spindle 17 features a perimeter ring 26, wherein the centering spindle 17, proceeding from the perimeter ring 26, is conically tapered both in the direction toward the front-side end region 25 and also in the direction away from the front-side end region 25. Thus the perimeter ring 26 protrudes outward.

In the installed state a wheel hub 6 is accommodated in the mounting gap 18 between the hub dome 15 and centering spindle 17. If the track or camber angle of the axle 2 changes, that is, if the wheel hub 6 changes, then the first bearing surface 13a and the second bearing surface 13b pivot upon each other in order to adjust the hub dome 15 for fixation.

Figure 8:
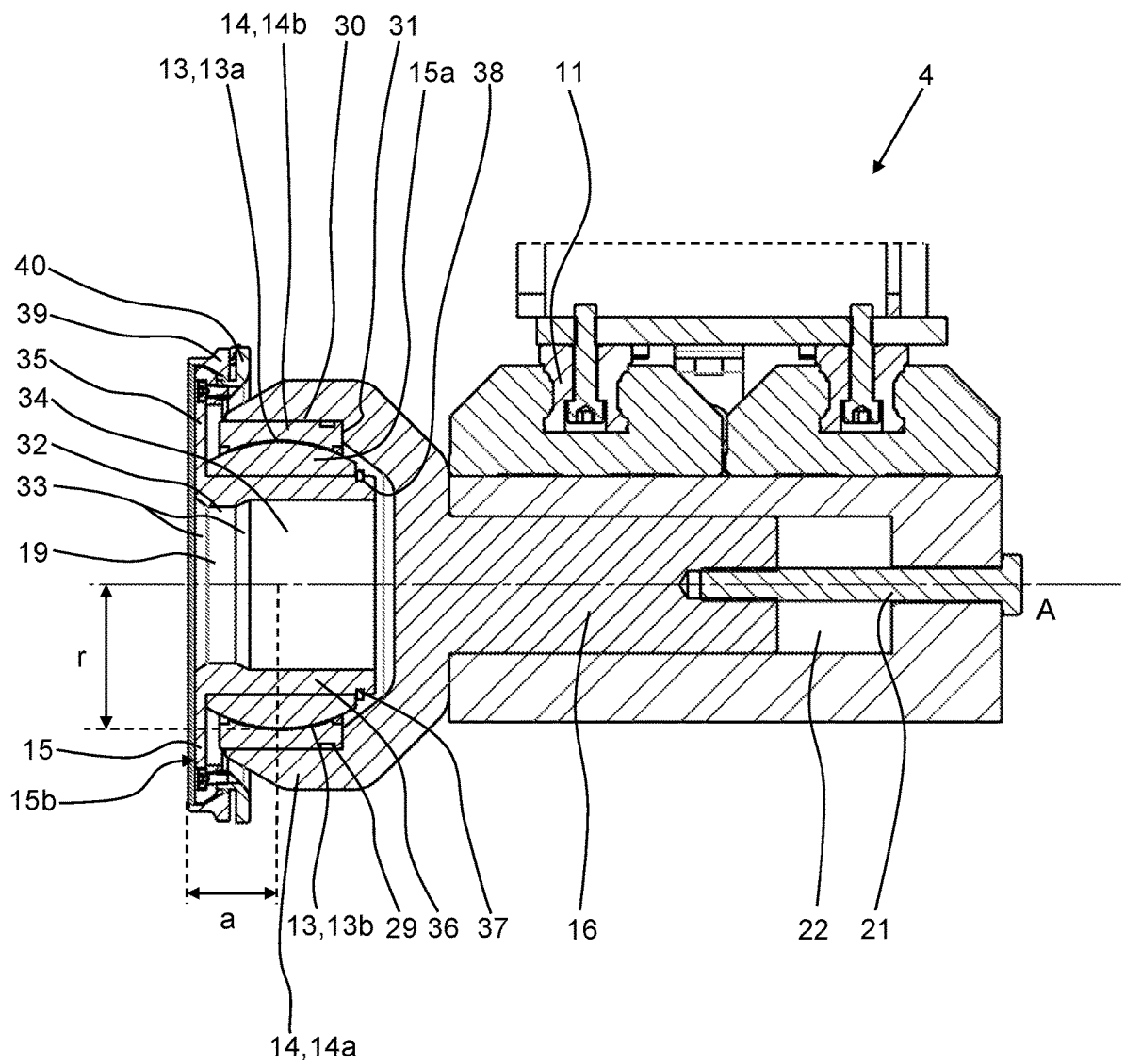
FIG. 8 A sectional view through a further embodiment of a mounting device for a device according to FIG. 1.

FIG. 8 shows a sectional view through another embodiment of a mounting device 4 for a device 1 according to FIG. 1. This embodiment also has an articulated head 14 on which a first bearing surface 13a of the two bearing surfaces 13 is formed. The articulated head 14 is pot-shaped, and the first bearing surface 13a is formed here as an inner circumferential surface.

The fastening region 12 has a mounting shaft 16. The mounting shaft 16 is formed integrally with a part of the articulated head 14 and extends, in particular symmetrically, along the axis A. The articulated head 14 has an articulated head external element 14a and an internal articulated head casing 14b. The articulated head external element 14a is advantageously formed integrally with the mounting shaft 16. The first bearing surface 13a is formed here on the internal articulated head casing 14b of the articulated head 14. The first bearing surface 13a is spherically arched in the cross-section shown.

A second bearing surface 13b of the two bearing surfaces 13 is formed as an outer circumferential surface on a hub dome casing 15a of a hub dome 15. The hub dome casing 15a is mounted on a shaft 36 of the hub dome 15. Consequently, the hub dome 15 of the fastening region 12 is pivotally supported on the first bearing surface 13a. The shaft 36 extends into the articulated head 14. Preferably, the shaft 36 extends further into the articulated head 14 than the hub dome casing 15a. The hub dome casing 15a is slid onto the shaft 36 and secured to the shaft 36 by a securing means 37, which is here formed as a locking ring. The securing means 37 is held at least form-fitting in a groove 38 on the shaft 36.

The hub dome 15 is mounted on the articulated head 14 via the second bearing surface 13b on the hub dome casing 15a on the first bearing surface 13a of the internal articulated head casing 14b. The hub dome 15 has an abutment surface 15b on a hub dome disc 35, which is adjoined by the shaft 36 extending in the direction of the articulated head 14. The ratio of the radius r of the first bearing surface 13a at the point of intersection with the pivot point of the two bearing surfaces 13, apex of the first bearing surface 13a, to the distance a of the pivot point to the contact surface 15b along the axis A in this embodiment is approximately r/a=1.67. Preferably, the ratio r/a is in the range between 1 and 2, in particular between 1.4 and 1.8.

In this embodiment, the internal articulated head casing 14b is narrower than the hub dome casing 15a. The internal articulated head casing 14b is preferably formed in two parts with respect to its circumference, for example divided in half, in order to enable mounting on the second bearing surface 13b. The internal articulated head casing 14b is inserted into a corresponding recess 30 so as to abut a side wall 31 of the recess 30. The internal articulated head casing 14b advantageously has a groove 29. Screws (not shown) which pass through the articulated head 14, in particular the articulated head external element 14a, are inserted into the groove 29 in order to fasten the internal articulated head casing 14b in the articulated head 14, in particular in the articulated head external element 14a.

In this embodiment, a wheel hub 6, in particular with the wheel hub collar 6a, can extend into the hub dome 15, namely into the recess 34. In particular for abutment of the wheel hub collar 6a, the hub dome 15 preferably has a tapered area 32 with two guide slopes 33. The tapered area 32 locally reduces the inner diameter of a recess 34 in the hub dome 15. The recess 34 is formed in the shaft 36 of the hub dome 15. In this embodiment, the hub dome 15 is formed open in the direction of the mounting shaft 16. It is also provided that the recess 34 passes only partially through the shaft 36 of the hub dome 15.

It is particularly preferred that the internal articulated head casing 14b and the hub dome casing 15a are formed as a prefabricated spherical plain bearing. The prefabricated spherical plain bearing includes the first bearing surface 13a and the second bearing surface 13b. Nevertheless, a radially outer portion of the spherical plain bearing including the first bearing surface 13a is considered to be part of the articulated head 14, namely an internal articulated head casing 14b, and an inner portion of the spherical plain bearing including the second bearing surface 13b is considered to be part of the hub dome 15, namely a hub dome casing 15a. The spherical plain bearing is applied to the shaft 36 of the hub dome 15 for assembly and is fixed with the securing means 37.

The mounting shaft 16 is fixed in the mounting opening 22 by a screw 21. If the track or camber angle of the wheel axle 2, i.e. also of the wheel hub 6, changes, the first bearing surface 13a and the second bearing surface 13b pivot towards each other in order to track the hub dome 15 for fixing.

In order to detect the contact of a brake disk with the abutment surface 15b, the fastening region 12 has an abutment ring 39. The abutment ring 39 is preferably mounted on the hub dome 15 in a spring-loaded manner. The abutment ring 39 protrudes beyond the contact surface 15b so that it can be moved along its entire circumference, in particular parallel to the axis A, when a brake disc is correctly in contact. The circumference of the movement of the abutment ring can be detected by at least two, in particular at least four, at least six or at least eight sensors, whereby a correct bearing of a brake disc with the abutment surface 15b can be detected. If the abutment ring 39 is moved by a brake disk unevenly or only over part of its circumference along the axis A, this indicates that the brake disk is not in correct contact. Preferably, the sensors are arranged on a mating ring 40 that is rigidly connected to the hub dome 15.

The invention is not limited to the illustrated and described embodiments, but rather also encompasses all designs which are equivalent within the sense of the invention. It is expressly emphasized that the exemplary embodiments are not limited to all features in combination, rather, each individual part feature can by itself also have inventive significance even detached from all other part features. Furthermore, the invention is also not limited to the combination of features as described, but rather can also be defined by any other particular combination of particular features of all the disclosed individual features. This means that basically virtually each individual feature as described can be omitted and/or replaced by at least one individual feature disclosed elsewhere in the application.

While the above description constitutes the preferred embodiment of the present invention, it will be appreciated that the invention is susceptible to modification, variation and change without departing from the proper scope and fair meaning of the accompanying claims.

What is claimed is:

1. A device for measuring the geometry of an axle of a motor vehicle, comprising at least two mounting devices for fastening the opposing ends of the axle, and at least one detection means for detection of at least one geometric parameter of the axle, wherein the mounting devices are displaceably mounted in at least two spatial directions, wherein each of the mounting devices feature at least one fastening region for fastening of one end of the axle, at least the fastening region of the mounting device is pivot-mounted at least in part by means of at least two mutually movable, arched bearing surfaces.

2. The device according to claim 1, wherein the fastening region comprises at least one articulated head, and wherein a first bearing surface of the two bearing surfaces is provided on the articulated head.

3. The device according to claim 2, wherein a hub dome of the fastening region is pivot-mounted at least indirectly onto the first bearing surface.

4. The device according to claim 2, wherein the articulated head is a multi-part design.

5. The device according to claim 2, wherein at least the first bearing surface is arranged such that the first bearing surface penetrates at least in the installed state at least partially into a wheel hub of an axle or at least partly extends over a wheel hub of an axle.

6. The device according to claim 2, wherein a second bearing surface of the two bearing surfaces is designed on a hub dome, and wherein the hub dome is seated directly upon the articulated head.

7. The device according to claim 6, wherein the articulated head comprises an internal articulated head casing, and wherein the internal articulated head casing surrounds the hub dome.

8. The device according to claim 6, wherein the hub dome has at least one hub dome casing, and wherein the second bearing surface is formed on the hub dome casing.

9. The device according to claim 6, wherein the articulated head at least partly surrounds the second bearing surface.

10. The device according to claim 2, wherein the first bearing surface is an external perimeter surface or an internal perimeter surface.

11. The device according to claim 1, wherein at least a portion of the fastening region is mounted so as to rotate or so as to rotate actively.

12. The device according to claim 1, wherein the fastening region comprises at least one mounting shaft.

13. The device according to claim 12, wherein the mounting shaft comprises a front-side recess or wherein the mounting shaft is seated in a bearing housing.

14. The device according to claim 1, wherein the fastening region comprises at least one centering spindle.

15. The device according to claim 14, wherein the centering spindle comprises a front-side recess or wherein at least the centering spindle is of a multi-part design.

16. The device according to claim 14, wherein the centering spindle comprises at least one perimeter ring spaced away from a front-side end region, and wherein the centering spindle is of a conically tapered design proceeding from the perimeter ring in the direction of the end region.

17. The device according to claim 14, wherein the fastening region comprises at least one mounting shaft, and wherein a second bearing surface of the two bearing surfaces is designed on the centering spindle, and wherein the mounting shaft comprises the articulation head so that the centering spindle can pivot on the articulated head of the mounting shaft.

18. The device according to claim 17, wherein the hub dome is connected to the centering spindle.

19. The device according to claim 14, wherein a hub dome surrounds the centering spindle in a ring-like manner, so that a wheel hub can be mounted at least in a partly pivoting manner between the centering spindle and the hub dome.

20. A mounting device for fastening of at least one of the opposing ends of an axle, for a device according to claim 1, wherein the mounting device comprises at least one fastening region for fastening of one end of the axle, wherein at least the fastening region of the mounting device is pivot-mounted at least in part by means of at least two mutually movable, arched bearing surfaces.

* * * * *